UNITED STATES PATENT OFFICE.

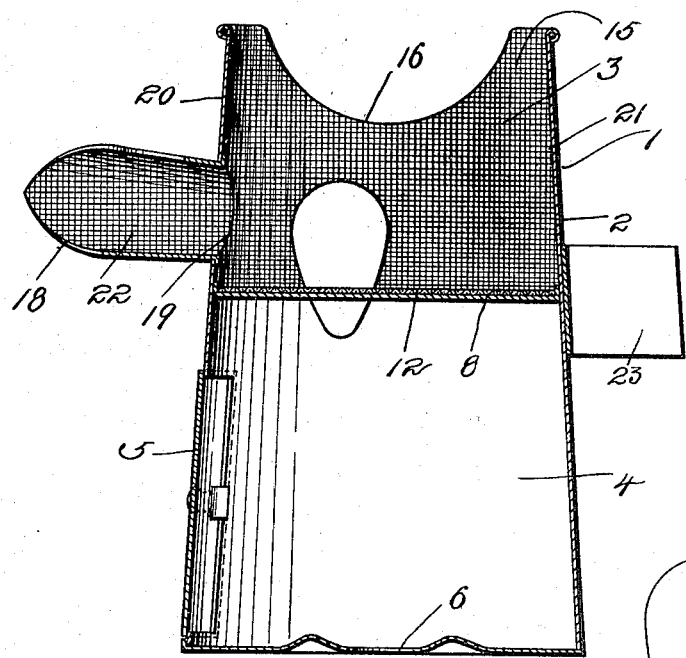
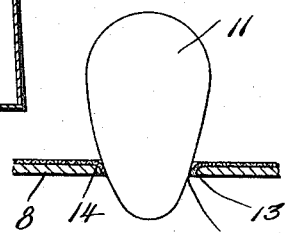
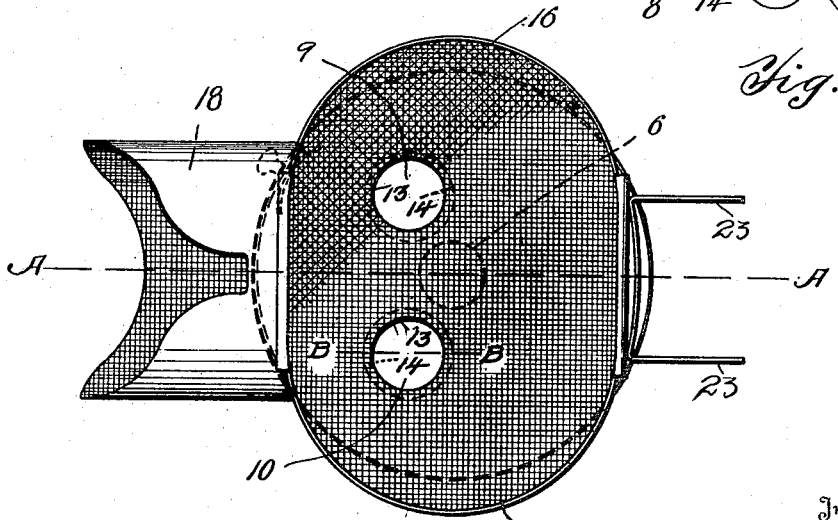

JESSE R. GRANT, OF KOKOMO, INDIANA.

EGG-CANDLER.

1,209,428.  Specification of Letters Patent.  Patented Dec. 19, 1916.

Application filed November 1, 1915. Serial No. 59,070.

*To all whom it may concern:*

Be it known that I, JESSE R. GRANT, a citizen of the United States, residing at Kokomo, in the county of Howard and State of Indiana, have invented certain new and useful Improvements in Egg-Candlers, of which the following is a specification.

This invention relates to egg candlers and has for its object to provide an exceedingly simple, inexpensive, yet effective egg candler, whereby the hands are free for the very rapid placing and removal of the eggs.

One feature of the invention is a dark room or compartment, all of the walls of which are black so as to prevent the reflection of light upon the eggs being candled.

Another feature of the invention is in providing the dark room or compartment with the egg holding wall and side walls only, said walls being black so as to avoid reflection of rays of light from the open upper end thereof, and the other portion of said room being open for the free use of the hands in placing or removing the eggs.

Still another object of the invention is to provide an egg candler having a dark room or compartment, the bottom wall of which is covered with a fabric, having the two fold function of absorbing light rays and protecting eggs seated in openings provided in said bottom wall.

The full nature of the invention will be understood from the accompanying drawings and the following description and claims.

In the drawings, Figure 1 is a sectional view of my invention taken on the lines A—A of Fig. 2. Fig. 2 is a top plan view of the invention. Fig. 3 is an enlarged detailed view on the line B—B of Fig. 2.

There is shown herein my improved egg candler 1 which consists of a receptacle 2 divided into an egg receiving compartment or dark compartment 3 and a light compartment 4 having a door 5 thereinto. This latter compartment is to hold a lamp, either electric, oil or gas, as desired, and is provided with an opening 6 in the bottom wall 7 thereof to admit air if necessary. A division wall 8 separates the compartments 3 and 4 and has openings 9 and 10 in which the eggs 11 to be tested are adapted to be placed. The wall 8 is entirely covered with a black felt or other fabric 12, the edges 13 of which overlap the edges 14 of the openings 9 and 10 so that the eggs will be protected from the hard edges of the openings in the wall 8, thus lessening the danger of breaking the eggs. The end 15 of the dark compartment 3 which is opposite the division wall 8 is open, the surrounding wall being cut away at 16 and 17 so as to facilitate the placing of eggs in said openings 9 and 10, by leaving the hands free for that purpose. A tubular eye shade 18 is secured to the window 19 in the wall 20 and so inclosed that a person's vision will be directed directly at the eggs 11 and toward the inner surface 21, said entire inner surface being painted black in order to absorb all light rays that may enter said opening 15. The inner surface 22 of the member 18 is also painted black so that there will be no reflecting surface in or about the dark compartment 3. A supporting member 23 is fixed on the outer part of the member 1 so that the device may be secured to any suitable object.

The invention broadly stated includes a dark compartment with a division wall between having an egg opening in it, the dark compartment being formed of said division wall and a surrounding wall extending therefrom, but without any wall opposite the division wall so the open side of the compartment will permit rapid placing and removal of eggs. An inspection opening is in the surrounding wall of the dark compartment and a tubular eye shade extends therefrom, so that the line of vision is substantially parallel with the division wall.

An egg candler constructed as above described and having a dark compartment with all of its walls black in which the eggs are seated for testing and with a suitable lamp in the compartment 4 will, notwithstanding the fact that the side of the dark compartment opposite the egg holding wall is open, make the eggs so translucent that the state of the preservation will at once be apparent by the person testing them.

The invention is not limited to an egg candler wherein the division wall 8 is horizontal, for it may be in other positions. Ordinarily the inspector views the side of the egg while it is being inspected in the apparatus, the light ordinarily passing from the light compartment longitudinally through the egg.

The invention claimed is:

1. An egg candler having an inspection compartment formed of a division wall with an egg opening in it and a surrounding wall extending from said division wall and without any wall opposite said division wall and with an inspection opening in said surrounding wall, and a light compartment behind said division wall.

2. An egg candler having a light compartment with an egg opening in the wall thereof, a wall surrounding said egg opening and extending from said light compartment to form a dark compartment with the outer end thereof open, and an inspection opening in said surrounding wall.

3. An egg candler having an inspection compartment formed of a division wall with an egg opening in it and a surrounding wall extending from said division wall and without any wall opposite said division wall and with an inspection opening in said surrounding wall near said division wall, and a light compartment behind said division wall.

4. An egg candler having an inspection compartment formed of a division wall with an egg opening in it and a surrounding wall extending from said division wall for a distance greater than the length of the eggs to be candled and without any wall opposite said division wall and with an inspection opening in said surrounding wall, and a light compartment behind said division wall.

5. An egg candler having an inspection compartment formed of a division wall with an egg opening in it and a surrounding wall extending from said division wall and without any wall opposite said division wall and the outer end of said surrounding wall being wider at one point than at the middle thereof, an inspection opening in the side portion of said surrounding wall, and a light compartment behind said division wall.

6. An egg candler having an inspection compartment formed of a division wall with an egg opening in it and a surrounding wall extending from said division wall and without any wall opposite said division wall and with an inspection opening in said surrounding wall, a tubular eye shade surrounding said inspection opening and extending from said surrounding wall, and a light compartment behind said division wall.

7. An egg candler having an inspection compartment formed of a division wall with an egg opening in it and a surrounding wall extending from said division wall and without any wall opposite said division wall and with an inspection opening in said surrounding wall, a tubular eye shade surrounding said inspection opening and extending from said surrounding wall at substantially a right angle thereto so that the line of vision will be substantially parallel with the division wall, and a light compartment behind said division wall.

8. An egg candler substantially tubular in form with a division wall separating it into a light compartment and a dark compartment, the division wall having an egg opening in it and the outer end of the dark compartment being entirely open and an inspection opening in the wall surrounding said dark compartment, and an eye shade extending from the wall of said dark compartment and surrounding the inspection opening.

In testimony whereof I affix my signature in the presence of a witness.

JESSE R. GRANT.

Witness:
GEO. C. BOLAND.